United States Patent [19]

Lutz

[11] Patent Number: 5,709,482
[45] Date of Patent: Jan. 20, 1998

[54] INTEGRATED HANGER BEARING

[76] Inventor: David C. Lutz, 8807 Fox Briar La., Boerne, Tex. 78006-5585

[21] Appl. No.: 788,996

[22] Filed: Jan. 27, 1997

[51] Int. Cl.$^6$ ..................................................... F16C 35/02
[52] U.S. Cl. .................................. 384/434; 384/444
[58] Field of Search .................................. 384/282, 295, 384/416, 418, 419, 428, 434, 435, 436, 437, 442, 444

[56] References Cited

U.S. PATENT DOCUMENTS

| | | | |
|---|---|---|---|
| 1,167,672 | 1/1916 | Barry . | |
| 1,255,443 | 2/1918 | Lea | 384/419 |
| 1,278,500 | 10/1918 | Pereira et al. . | |
| 1,306,623 | 6/1919 | Pieper . | |
| 2,585,859 | 2/1952 | Showalter . | |
| 2,823,961 | 2/1958 | Showalter . | |
| 2,992,049 | 7/1961 | Siebert et al. | 384/442 |
| 3,383,142 | 5/1968 | Scott | 384/295 |
| 4,391,422 | 7/1983 | McDonald | 242/129.6 |
| 4,560,290 | 12/1985 | Siebert | 384/434 |
| 4,640,631 | 2/1987 | Belanger | 384/297 |
| 4,729,674 | 3/1988 | Siebert et al. | 384/434 X |
| 5,056,982 | 10/1991 | Stockham | 414/607 |
| 5,169,244 | 12/1992 | Siebert et al. | 384/276 |

FOREIGN PATENT DOCUMENTS

64717  4/1942  Norway ................................. 384/428

*Primary Examiner*—Thomas R. Hannon
*Attorney, Agent, or Firm*—Tom Hamill, Jr.

[57] ABSTRACT

A hangar bearing is designed to be employed in a drying oven, generally known as a "tunnel" type, which is used to dry plywood, veneer board, fiber, or gypsum board. The hanger bearing main body support is made from a pair of identical stamped forms or fabricated plates which include various matched bores to facilitate both mounting and mutual securement. Each of the main body plates includes a depression that conforms to provide a bearing insert support cavity when the plates are fitted together. The bearing insert support cavity may or may not include anti-rotational flanges and/or longitudinal travel stops to hold the semi-cylindrical bearing insert element in place. A steel retaining loop or strap is provided to overarch the bearing element, once it is in place, the loop or strap being preferably provided with a hinge and a releasable retaining clip. The semi-cylindrical bearing insert element supports the rotating journal or shaft of the conveyor rollers and the strap or loop prevents the shaft from being displaced due to axial vibration. The novel construction of the integrated hanger bearing allows for modular replacement of various parts of the device due to high temperature wear.

14 Claims, 8 Drawing Sheets

INTEGRATED HANGER BEARING

BACKGROUND OF THE INVENTION

1. Field of the Invention

The present invention relates generally to hanger bearings for conveyor-type mechanisms. More specifically, it relates to an improved self-aligning hanger bearing construction that allows maintenance workers to easily assemble and disassemble the hanger bearing housing for examination with regards to part wear and the subsequent replacement of any worn parts which are detected. Even more specifically, the present invention relates to a hanger bearing assembly wherein a loop or strap member, made preferably of steel plate or similar substance, ensures that the shaft journal of the roller is maintained in the appropriate position during the case of axial vibration of the roller during operation. The novel construction of the safety strap also allows the bearing to be removed from the journal shaft/roller assembly without disassembly of the drive mechanism.

2. Description of the Prior Art

In large drying ovens, such as those that are used for the drying of plywood, veneer board, fiber board, gypsum board, and the like, it is the norm to use long "tunnel dryers" wherein the objects to be dried are passed through on rollers. These rollers are kept at moderate speeds, usually require a minimum of two bearings, and operate at high temperatures. These operating temperatures and the size of the ovens involved make shutdowns for maintenance an expensive proposition. Additionally, many of the bearing housing assemblies currently used for this purpose are expensive to replace, along with being difficult to access for repair or replacement. The present invention seeks to address these problems by presenting a new and improved hanger bearing housing assembly that overcomes the disadvantages of the prior art. The present invention does not require disassembly of the drive mechanism in the ovens and furthermore is manufactured such that worn or damaged portions of the bearing itself or the housing assembly that holds it in place can be modularly replaced. A search at the United States Patent and Trademark Office uncovered a number of relevant patents and these are discussed hereinbelow.

U.S. Pat. No. 1,167,672 issued on Jan. 11, 1916 to Nicholas Barry discloses a shaft hanger wherein a pair of parallel tubular members are adapted to receive a U-shaped bail. The bail is adjustable in respect to the tubular members and includes a two part journal box that is also adjustable to align with the shaft. A cross bar is provided between the tubular members that allows for manual positioning of the journal box. This is clearly unlike the present invention in that there is no showing of the hinged safety strap or loop as is seen in the instant invention.

In U.S. Pat. No. 1,278,500 issued on Sep. 10, 1918 to Manuel S. Pereira there is disclosed a bearing assembly. Unlike the present invention, the journal or shaft is completely surrounded by the bearing material, it being attached to both the fixed and the movable portions of the assembly. Additionally, there is no teaching of the modular construction, removability of the bearing material, etc. that is an integral part of the instant invention.

Another patent of interest is U.S. Pat. No. 1,306,623 issued on Jun. 10, 1919 to Chester R. Peiper. This is a shaft hanger that allows for various adjustments. Unlike the present invention, there is no teaching of the releasable, hinged safety strap or loop to limit axial movement during vibration and the self alignment that is provided to the shaft when the vibration or movement ceases.

U.S. Pat. No. 2,585,859 issued on Feb. 12, 1952 to Frank W. Showalter discloses a turntable for paper roll stands. This device includes bearing members and recesses that contain the paper arbors in place, however, it is unlike the instant invention in that the construction of the main body of the hanger assembly (the portion that holds the bearing material in place) does not show the bilateral symmetry and, thus, the ease of manufacturing that the present invention supplies. Additionally, the hinge and releasable latching structure disclosed in Showalter '859 is unlike the instant invention as claimed.

U.S. Pat. No. 2,823,961 issued on Feb. 18, 1958 to Frank W. Showalter discloses a saddle bearing. As in the other Showalter patent described above, this does show a type of retainer bar that prevents movement of the paper arbor when in the closed position. However, it does not disclose the novel bearing material retaining means that allows for the bearing material to be examined and replaced, nor is their any teaching of the specific construction of the releasable latch used in the retaining strap of the instant invention.

U.S. Pat. No. 4,391,422 issued on Jul. 5, 1983 to Colin McDonald discloses a weight balanced spool carrier. This is clearly dissimilar from the present invention in that no bearing element is shown. The cotter pins are merely used to retain the spool support shafts in place.

Next is U.S. Pat. No. 4,640,631 issued on Feb. 3, 1987 to James A. Belanger. This discloses a plastic bearing with a one-piece housing assembly. Though bearing retaining means to prevent rotation of the bearing material is disclosed (in FIG. 6), there is no teaching of the retaining loop or strap inherent in the instant invention.

Another patent of interest is U.S. Pat. No. 5,056,982 issued on Oct. 15, 1991 to Brian W. Stockham. This is a apparatus for handling paper stock. Unlike the present invention, there is no bearing material used in the apparatus, and the locking lever 42 disclosed in Stockham serves to stop the rotation of the shaft 10.

Lastly, U.S. Pat. No. 5,169,244 issued on Dec. 8, 1992 to Craig Siebert et al. discloses a releasable split bearing. The device has a opening that fits a cylindrical shell therein for the bearing material. Unlike the present invention, the roller drive mechanism must be removed before the bearing material can be examined or replaced. Additionally, there is no teaching of the releasable retaining loop or strap.

Thus, while the foregoing body of prior art indicates it to be well known to use various assemblies to suspend rollers or journaled shafts, the provision of a more simple and cost effective device as is seen in the instant invention is not contemplated. Nor does the prior art described above teach or suggest an integrated hanger bearing wherein the bearing material can be easily replaced when worn. The prior art also has the disadvantage of being expensive to manufacture. The foregoing disadvantages are overcome by the unique retainer loop or strap and the bilateral symmetry of the bearing material housing taught by the present invention as will be made apparent from the following description. Other advantages of the present invention over the prior art also will be rendered evident.

SUMMARY OF THE INVENTION

To achieve the foregoing and other advantages, the present invention, briefly described, provides an improved integrated hanger bearing assembly. It is contemplated that, in the preferred embodiment, the device would be employed in a drying oven, generally known as a "tunnel" type, which is used to dry plywood, veneer board, fiber, or gypsum board. The hanger bearing main body support is made from a pair of identical stamped forms or weldment fabricated plates which include various matched bores to facilitate both mounting and mutual securement. Each of the main body plates includes a depression that conforms to provide a bearing insert support cavity when the plates are fitted together. The bearing support cavity may include anti-rotational flanges and/or longitudinal travel stops to hold the semi-cylindrical bearing insert element in place. Other embodiments may include a single anti-rotational flange. Still other embodiments may have no anti rotational flanges at all. A steel retaining loop or strap is provided to overarch the bearing insert element, once it is in place, the loop or strap being preferably provided with a hinge and a releasable retaining clip. The semi-cylindrical bearing insert element supports the rotating journal or shaft of the conveyor rollers and the strap or loop prevents the shaft from being displaced due to axial vibration. The novel construction of the integrated hanger bearing allows for modular replacement of various parts of the device due to high temperature wear.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the preferred embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention is to provide a new and improved integrated hanger bearing assembly wherein the various elements of the hanger bearing can be examined and/or replaced without disassembling the drive mechanism of the conveyor.

It is still a further object of the present invention is to provide a new and improved integrated hanger bearing assembly wherein various types of bearing inserts can be provided for varying environments.

Still a further object of the present invention is to provide a new and improved integrated hanger bearing assembly where the entire bearing support apparatus can be replaced as a unit quickly and efficiently.

Still yet another object of the present invention is to provide an integrated hanger bearing assembly wherein anti-rotational locking means and longitudinal travel stops are provided as part of the bearing insert support structure.

Another object of the present invention is to provide an integrated hanger bearing assembly wherein a retaining strap or loop is used to maintain the supported journal or shaft in place in case of axial vibration.

And still yet another object of the present invention is to provide an integrated hanger bearing assembly wherein the retaining strap or loop is hinged and includes a releasable clip so that the entire hanging bearing assembly can be detached from the journal or shaft without the necessity of disassembling the drive mechanism.

It is therefore an object of the present invention to provide a new and improved integrated hanger bearing assembly which has all of the advantages of the prior art and none of the disadvantages.

It is another object of the present invention to provide a new an improved integrated hanger bearing assembly which may be easily and efficiently manufactured and marketed.

It is a further object of the present invention to provide a new and improved integrated hanger bearing assembly which is of durable and reliable construction.

An even further object of the present invention is to provide a new and improved integrated hanger bearing assembly which is susceptible of a low cost of manufacture with regard to both materials and labor, and which accordingly is then susceptible of low prices of sale to the consuming public, thereby making such integrated hanger bearing assembly available to the buying public.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

With reference now to the drawings, a new and improved integrated hanger bearing embodying the principles and concepts of the present invention will be described.

Figure 1:
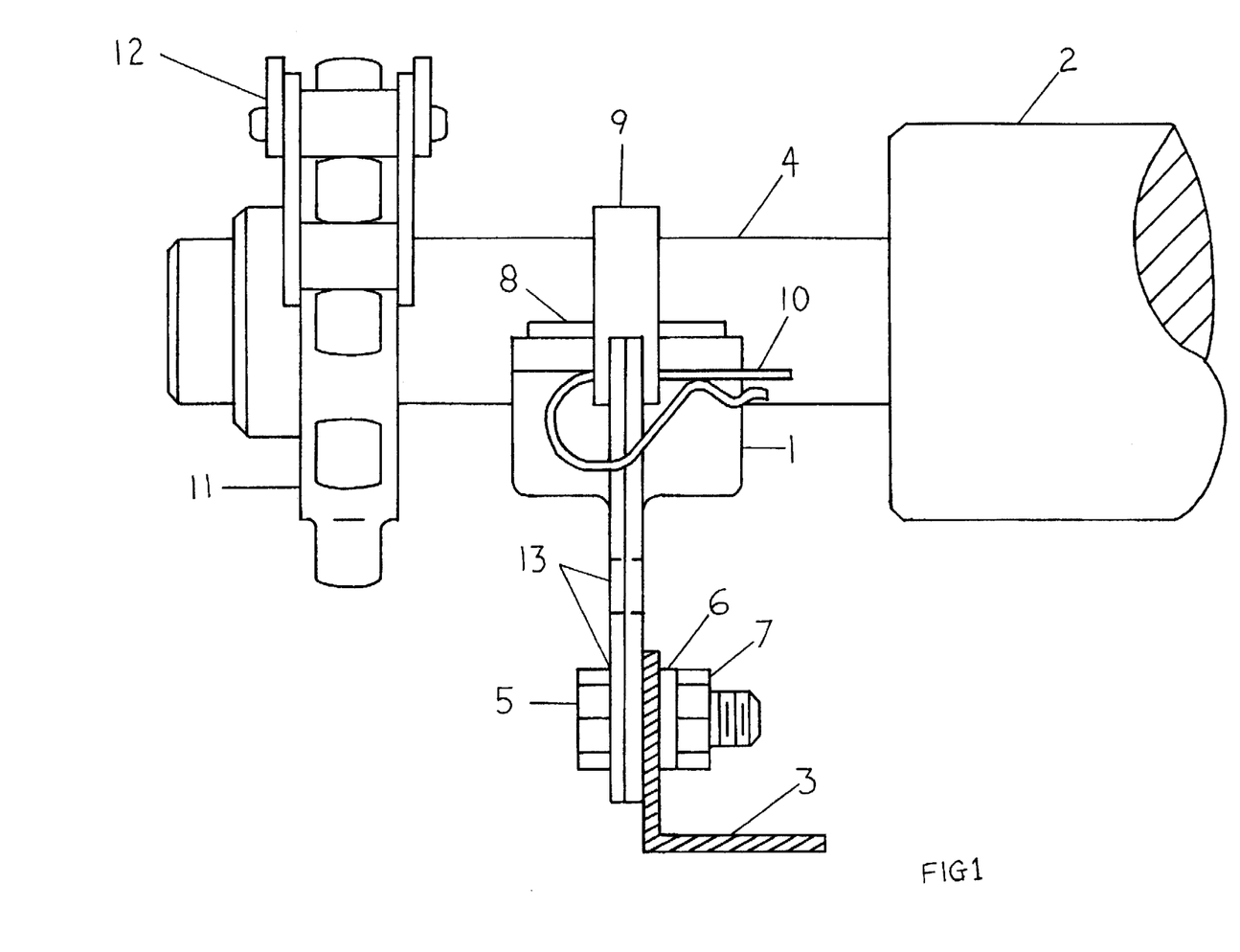
FIG. 1 is a front elevational view showing the preferred embodiment of the integrated hanger bearing of the invention.

Referring specifically to FIG. 1, the hanger bearing assembly 1 is shown in the contemplated environment. The hanger bearing 1 is rotatably supporting a shaft journal 4 and that, in turn, carries a roller 2. As mentioned above, it is anticipated that device would be employed in a drying oven of the "tunnel" type commonly used to finish plywood, veneer board, gypsum, or fiber board. In these devices, high temperatures are maintained, and these temperatures promote and encourage wear in bearings that support the rollers within the ovens. As many of these ovens can be long (up to 300 feet) it is readily understood that bearing replacement can be a costly and time consuming process. The hanger bearing assembly 1 is mounted to a portion of the dryer's subframe, by an L shaped attachment means 3. This attachment means 3 includes securing elements comprising a bolt 5, lockwasher 6, and nut 7. It should be emphasized that many other types of means to attach the hanger bearing assembly to the dryer may be utilized: and various other positions of the attachments could be readily envisioned. The shaft journal 4 carries a sprocket 11 that cooperates with the drive chain 12, as is well known in the art.

Referring now to FIGS. 2A, 2B, 3A & 3B the retaining strap 9 or loop portion of the hanger bearing assembly 1 is shown. The retaining strap 9 may be made out of rigid steel and could be stamp formed from substantially flat steel plate or produced from a metal casting and machined to the final, appropriate tolerance. Other means of manufacture may be employed. At either end of the retaining strap 9 are a pair of depending legs 9' and 9". Though these are only shown at one end of the retaining strap 9, it should be understood that the other end is substantially similar. Both sets of depending legs 9' and 9" have aligned apertures 15 and 17 therethrough. Aligned apertures 15 will help form the hinge means by allowing an industrial grade steel roll pin 15' to be inserted therethrough along in a mating arrangement with the cooperating apertures (not shown) through the hanger bearing assembly 1 of the bearing insert support. The roll pin 15' is pressed through and held in place by interference fit and, in the preferred embodiment, the ends of roll pin 15' are flush with the outer portions of the retaining strap 9 depending parallel legs 9' and 9". Distal the hinge means end 35 of the retaining strap 9 is the releasable clip means 38. The clip means 38 is comprised of a cotter pin 10 that is inserted through apertures 17 in both the depending parallel legs 9', 9" and body portions 18, 19 (discussed further below and seen in FIGS. 4A, 4B, 5A, 5B & 5C). The cotter pin 10 may be comprised of hardened steel or other materials with appropriate engineering material properties.

Figure 2A:
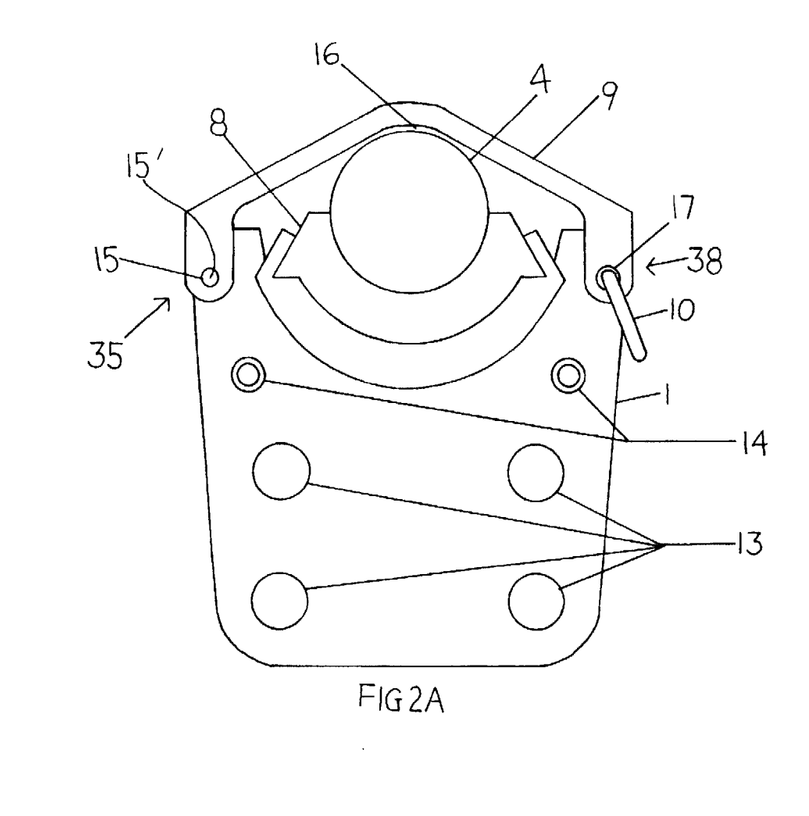
FIG. 2A is an end view of the present invention with the retaining strap in the closed position.
Figure 2B:
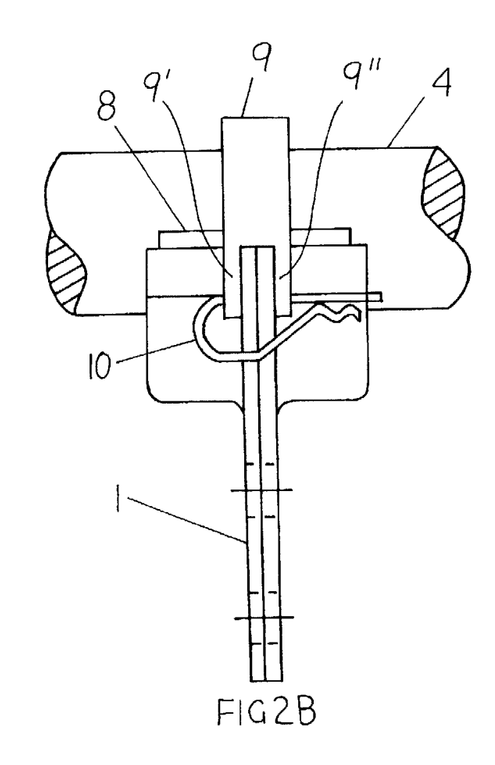
FIG. 2B is a side view of the present invention with the retaining strap in the closed position.
Figure 3A:
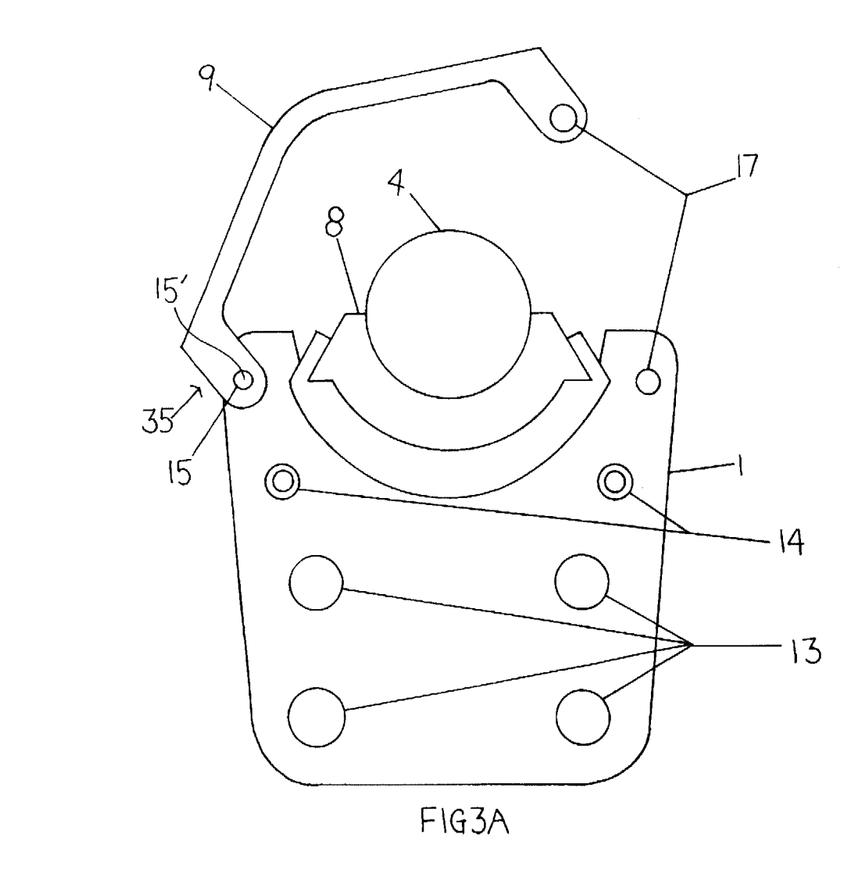
FIG. 3A is an end view of the present invention showing the retaining strap in the open position with its releasable strap removed.
Figure 3B:
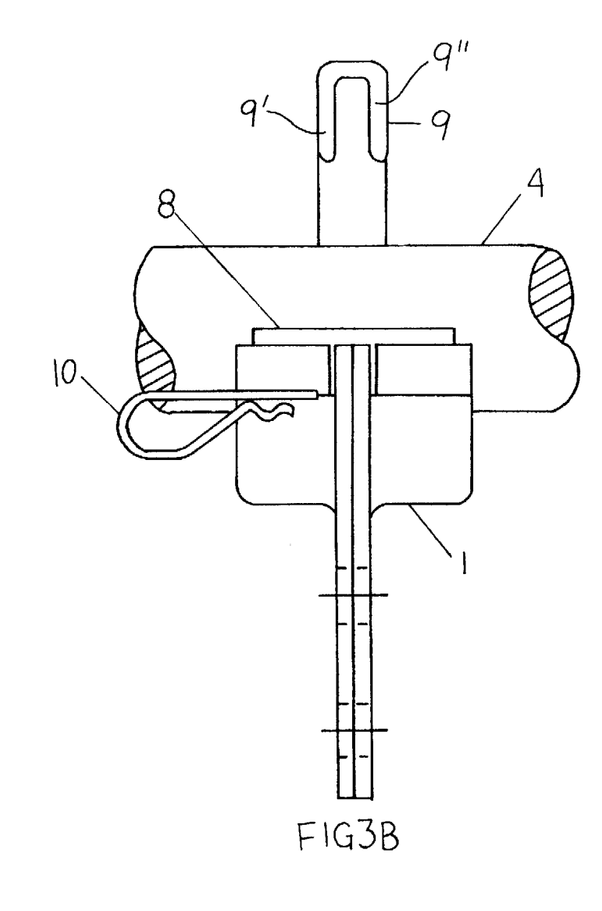
FIG. 3B is a side view of the present invention showing the retaining strap in the open position with its releasable strap removed.

In FIGS. 2A and 2B the retaining strap 9 is seen in the closed or operational position. As the journal shaft 4 rotates on bearing material insert 8, it is maintained in the proper alignment by retaining strap 9. There is an established clearance, indicated at 16, between the retaining strap 9 and the journal shaft 4. In case the shaft 4 experienced axial vibration or displacement, the retaining strap 9 would hold it in place and, once the vibration was ceased, the shaft 4 would self align in relation to the bearing insert 8. FIGS. 3A and 3B shows the device in the open position, that would allow the bearing to be attached or removed from the shaft journal 4 very easily, as will be discussed further hereinbelow.

Figure 4A:
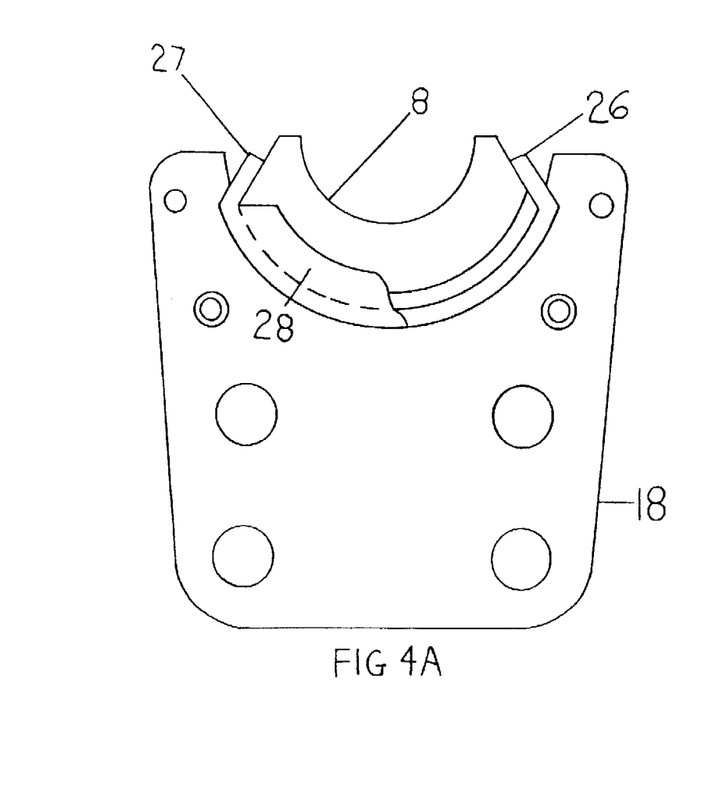
FIG. 4A is an end view, partially in section, of the bearing insert element containment housing.
Figure 4B:
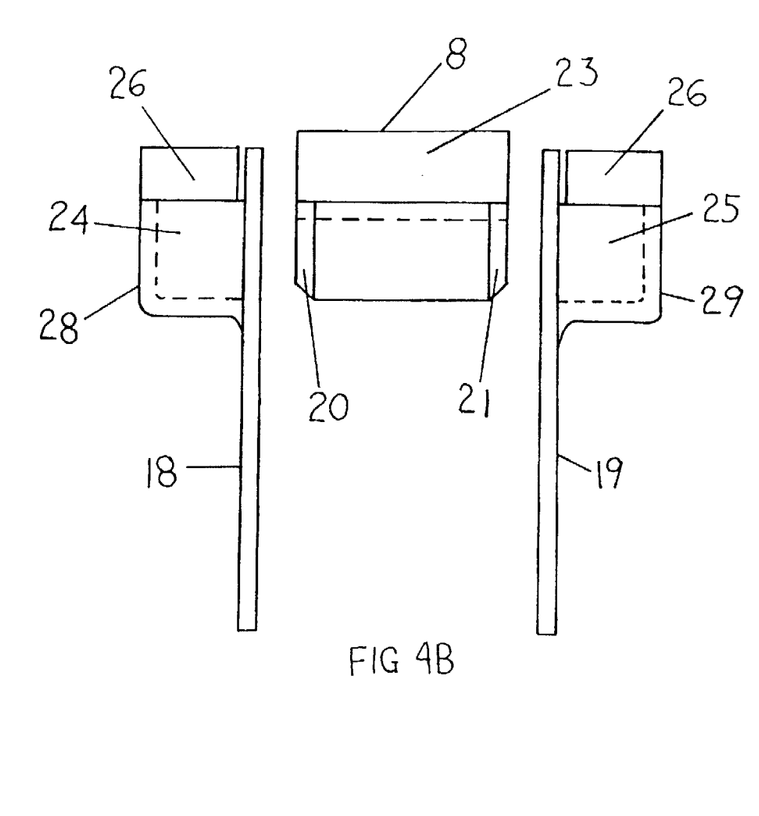
FIG. 4B is an exploded side view, partially in section, of the bearing element containment housing.
Figure 5A:
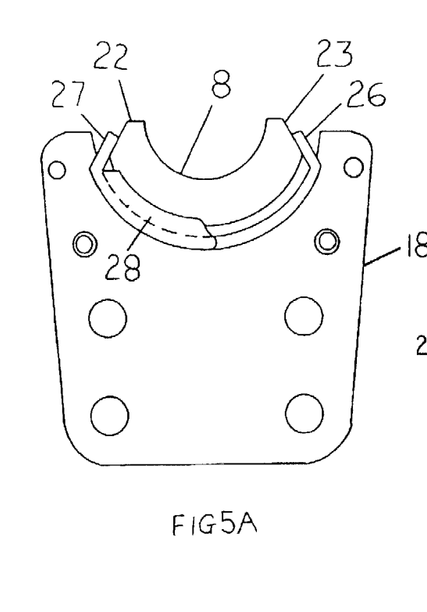
FIG. 5A is an end view, partially in section, showing further details of the present invention.
Figure 5B:
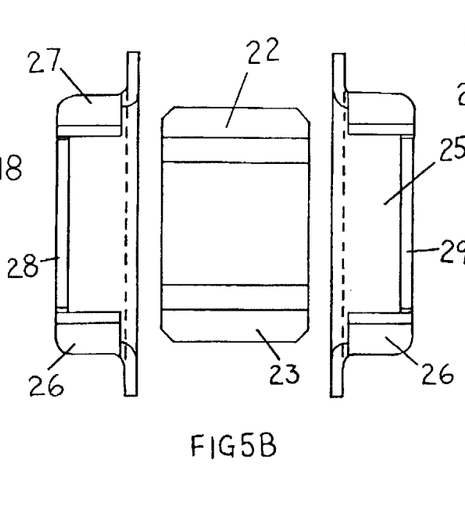
FIG. 5B is an exploded top view of the present invention.
Figure 5C:
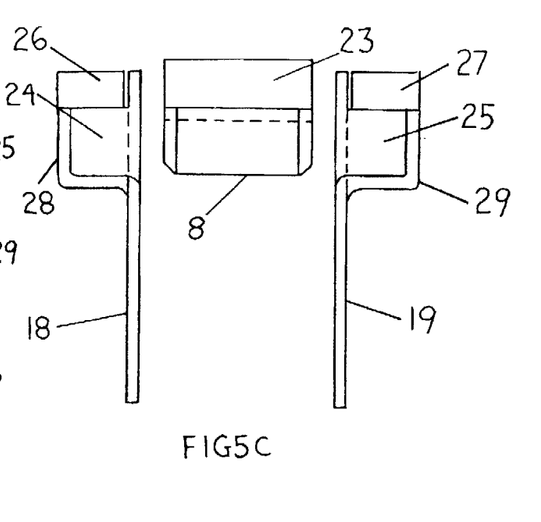
FIG. 5C is an exploded side view of the present invention.
Figure 6A:
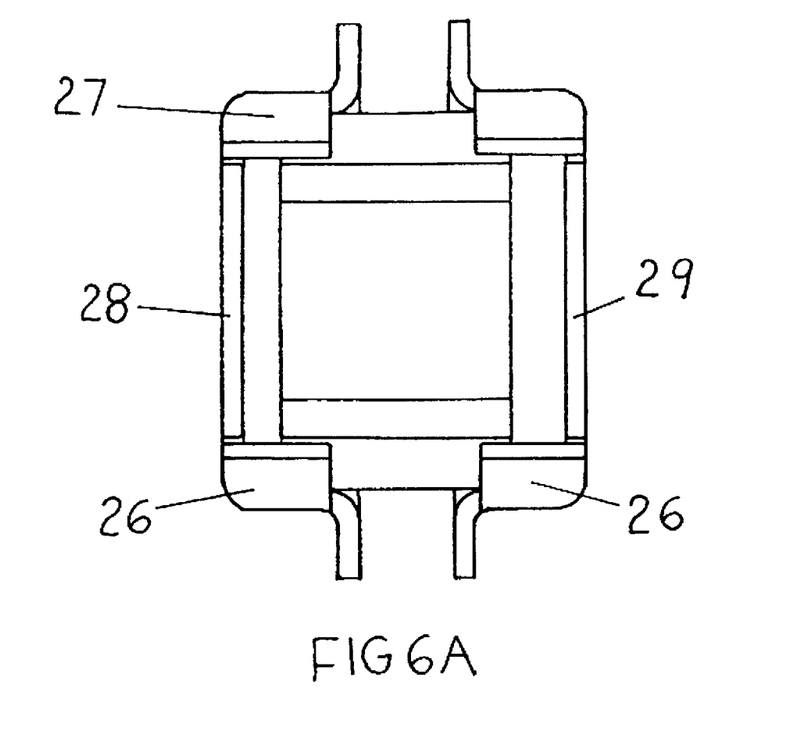
FIG. 6A is and exploded top view, partially in section, showing the anti-rotational locking element.

The discussion now turns to the construction of the bearing containment housing. The bearing containment housing is made up of two identical stamped or formed plates 18, 19. As best shown in FIGS. 4A and 4B, as well as FIGS. 5A, 5B & 5C, each of the plates 18, 19 includes a cooperating bearing insert cavity indicated at 24 and 25. These cavities 24, 25 are each one half the length of the bearing insert 8. It should be noted here that each plate 18, 19 exhibits bilateral symmetry along an axis, the line of which is equidistant from the bores 13 and 14 seen in FIG. 1. Thus it should be emphasized that the plates 18, 19 are identical and can be formed from the same stamping dies. This is important as it greatly reduces the cost of manufacturing the device. The bearing insert 8 is generally semi-cylindrical in shape. The end views in FIGS. 4A and 5A show the bearing insert 8 includes angled sides 22 and 23 that extend the full length of the bearing insert 8. The preferred angle of these sides is 60° relative the horizontal, though, of course, other angles could be used as desired. These angled sides cooperate with the formed tabs 26 and 27 in the front and backs of the bearing insert cavities 24 and 25. The formed tabs 26 & 27 act as anti-rotational flats, keeping the bearing material insert 8 from rotating. The bearing insert 8 also includes a pair of chamfered ends 20 and 21. The preferred angle of these chamfered edges is 45°, though, as mentioned above, other angles could be used. The transverse faces 28 & 29 form a boundary for the cavities 24 & 25. Also, these transverse faces 28 and 29 serve as stops to locate and protect the bearing element 8 and also serve as thrust absorption members in the event of axial or longitudinal vibration or displacement of the shaft journal 4.

The integrated hanger assembly 1 may be easily assembled. The two plates 18 and 19 are brought together with the bearing insert 8 simultaneously fitting into both the insert support cavities 24 and 25. Formed tabs 26 and 27 serve to guide bearing insert 8 into the proper position by cooperating with the angled sides 22 and 23. Countersunk screws or rivets are then inserted into cooperating retaining apertures 14. It is also proposed that the cooperating retaining apertures 14 may be secured by spot welding. When the hanger bearing is rotatably supporting the journal shaft 4, the formed tabs 26 and 27, along with the angled sides 22 and 23, serve to provide an anti-rotational lock on the bearing insert 8.

Various materials may be employed in the manufacture of the bearing insert 8. In a high-temperature environment, as is contemplated in the preferred embodiment described herein, a layer-lattice type of solid lubricant would be ideal. Common types of these are graphite and molybdenum disulfide, commonly known as molysulfide. Other types of inserts could be made of silicon carbide, carbon, carbon-graphite, carbon-carbon, various polymers, thermosetting resins, hardwoods, or other types of materials deemed to meet specific environmental and design criteria.

Another clear advantage in the present invention is the modular design that allows for the various elements that make up the integrated hanger bearing to be examined and, if worn or damaged, replaced. The removal of the hanger bearings along a tunnel type dryer is quickly and easily accomplished with the novel construction of the instant invention, in that the hanger bearings can be detached from their journal shafts by simply releasing the retaining strap 9 by means of the releasable clip 10 and hinge 15, 15', as is seen in FIGS. 2A and 2B. The hanger bearings can now be examined for wear by placing them in a vise or similar clamping type device and drilling out or otherwise removing the retaining means in retaining apertures 14, as were discussed above. Plates 18 and 19 are taken apart and all the various elements of the device, especially the bearing insert 8, can be examined for wear. The retaining strap 9, if it is worn, can be removed and replaced by using a properly sized drift pin and hammer to remove roll pin 15' and, thus, free retaining strap 9. Once any worn elements are found and replaced, the device can be easily reassembled and reattached to the journal shaft 4. It can be seen that the present invention allows a manufacturer to replace and then examine large numbers of hanger bearing at regular intervals, thus minimizing the chance of a bearing failure in the high temperature environment that is created in a tunnel type dryer.

Figure 7A:
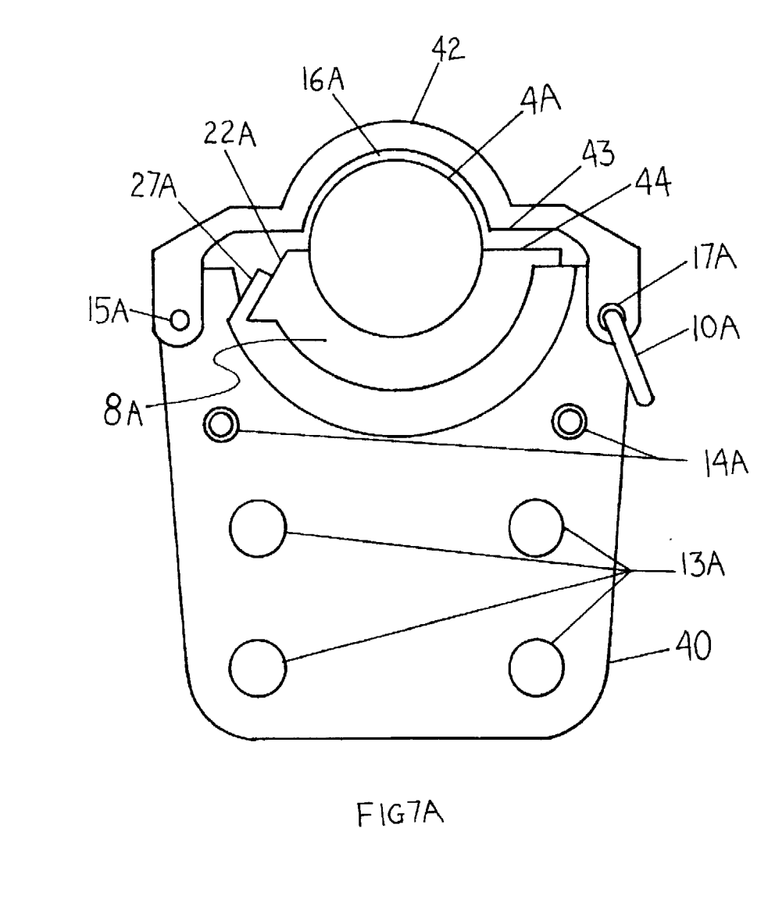
FIG. 7A is an end view of a second embodiment of the present invention showing the retaining strap in the closed position.
Figure 7B:
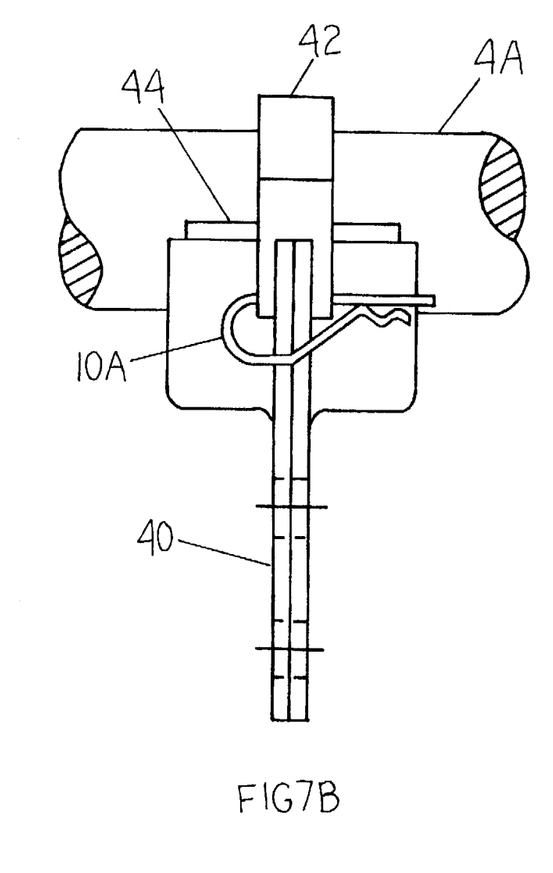
FIG. 7B is a side view of a second embodiment of the present invention showing the retaining strap in the closed position.
Figure 8A:
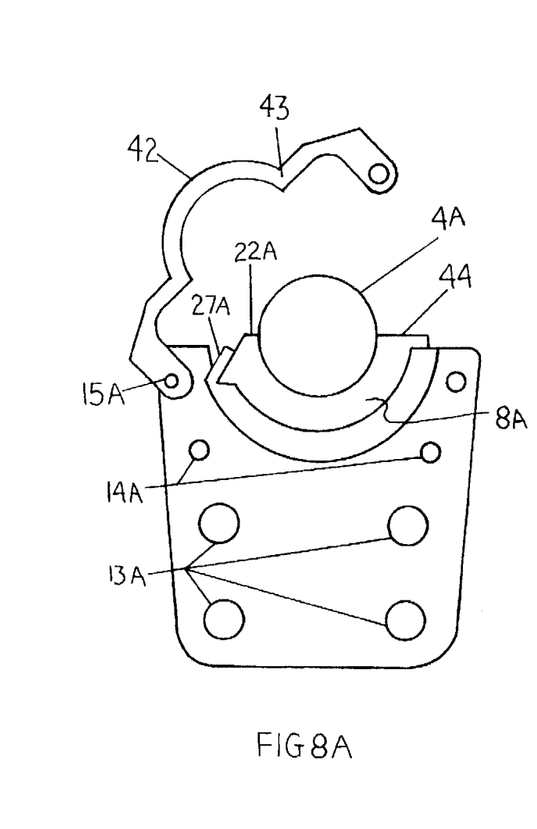
FIGS. 8A, 8B, & 8C describes a step by step process for the removal of the bearing insert.
Figure 8B:
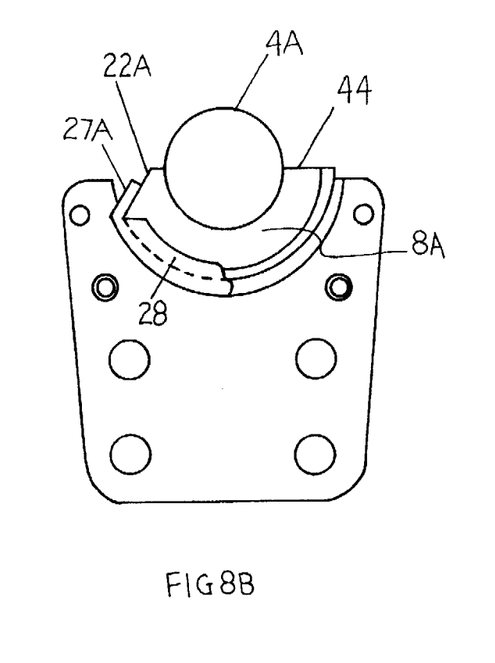
Figure 8C:
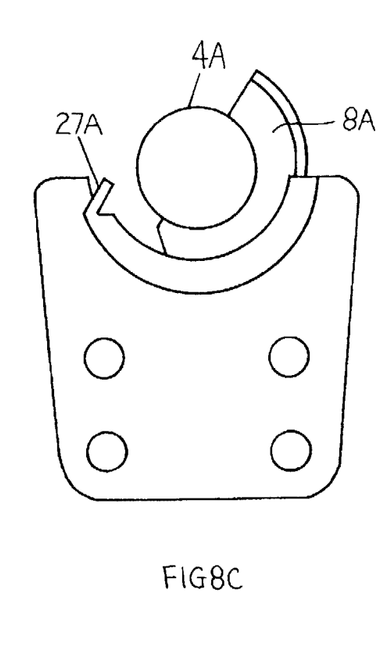

Other embodiments of the invention have been considered. It is to be understood that these embodiments are similar in placement and orientation about the shaft. The differences lie in the actual structure proximal the bearing insert and the loop strap. Turning now to FIGS. 7A and B, a second embodiment of the hanger bearing 40 is shown. In this embodiment, there is only one anti rotational flat 27A. The angled side 22A of the bearing insert 8A remains substantially similar to the first aforementioned embodiment. The bearing insert 8A includes a flat side 44 located on a first side of the length of the semi-cylindrical bearing 8A. Flat side 44 has an orientation which is collinear with a radial line of the shaft 4A. The loop strap 42 has been modified in the second embodiment to include a horizontal flat portion 43. The horizontal flat portion 43 resides above the flat side 44. This embodiment permits the replacement of the bearing insert 8A without disturbing either the bracket assembly mounting or any of the shaft drive mechanism. FIGS. 8A, 8B and 8C generally shows the bearing insert 8A replacement method. The replacement method would be to remove the securing pin 10A, rotate the loop strap 42 out of the way about 15A, remove the bearing insert 8A by rotating it about the shaft 4A in a direction opposite the angled anti-rotation flat 27A. At this point a new bearing insert will be placed into the assembly by generally reversing the procedure. The loop strap 42 would be replaced and secured atop the shaft 4A and bearing insert 8A by securing pin 10A.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by LETTERS PATENT of the United States is as follows:

1. A new and improved integrated hanger bearing for rotatably supporting a shaft comprising:

a pair of cooperating plates, each of said plates having a generally planar portion and a recessed portion having an opening;

a semi-cylindrical bearing means adapted to be fit into said recessed portions of said cooperating plates when said cooperating plates are brought into contact with one another;

retaining means for holding said cooperating plates in contact with one another; and rotational prevention means to hold said semi-cylindrical bearing and said cooperating plates in a fixed relationship with one another when the shaft is rotating in contact with said semi-cylindrical bearing, where said rotational prevention means comprises a pair of angled edges along the length of said semi-cylindrical bearing and further includes cooperating tabs integral with said recessed portions of said cooperating plates; whereby said semi-cylindrical bearing means is held in said recessed portions of said cooperating plates and said bearing is exposed at said recessed portion openings and said semi-cylindrical bearing rotatably supports a shaft.

2. The integrated hanger bearing according to claim 1, further including a retaining strap, said retaining strap being releasably attached to said planar portions of said cooperating plates when said plates are retained in contact with one another, said retaining strap extending over said exposed portion of said semi-cylindrical bearing, said retaining strap being adapted to retain the shaft in alignment with said bearing.

3. The integrated hanger bearing according to claim 2, wherein said retaining strap has a first end and a second end, and where each of said ends includes a pair of parallel legs adapted to fit over said planar portions of said cooperating plates when said cooperating plates are retained in contact with one another.

4. The integrated hanger bearing according to claim 3, wherein said retaining strap includes a hinge means, said hinge means comprising a pair of first aligned apertures in said parallel legs proximate said first end of said retaining strap and a pair of first cooperating aligned apertures in each of said cooperating plates, and where a pin is inserted through said first aligned apertures and said first aligned cooperating apertures to snugly friction fit therein, thus providing a point of rotation proximate said first end of said retaining strap.

5. The integrated hanger bearing according to claim 4, wherein said retaining strap further includes a releasable attachment means, said releasable attachment comprising a pair of second aligned apertures in said parallel legs proximate said second end of said retaining strap and a pair of second cooperating aligned apertures in each of said cooperating plates, and where a pin including a pin grasping means is inserted through said second aligned apertures and said second aligned cooperating apertures to removably fit therein, thus providing an releasable attachment point proximate said second end of said retaining strap.

6. The integrated hanger bearing according to claim 1, wherein said semi-cylindrical bearing means is made of a material selected from the group consisting of graphite, molybdenum disulfide, silicon carbide, carbon-carbon, a polymer, or thermosetting resin.

7. A new and improved integrated hanger bearing for rotatably supporting a shaft comprising:

a pair of cooperating plates, each of said plates having a generally planar portion and a recessed portion having an opening;

a semi-cylindrical bearing means adapted to be fit into said recessed portions of said cooperating plates when said cooperating plates are brought into contact with one another;

retaining means for holding said cooperating plates in contact with one another; and rotational prevention means to hold said semi-cylindrical bearing and said cooperating plates in a fixed relationship with one another when the shaft is rotating in contact with said semi-cylindrical bearing, where said rotational prevention means comprises an angled edge along a first side of the length of said semi-cylindrical bearing and further includes a cooperating tab integral with said recessed portion of said cooperating plates; whereby said semi-cylindrical bearing means is held in said recessed portions of said cooperating plates and said bearing is exposed at said recessed portion openings and said semi-cylindrical bearing rotatably supports a shaft.

8. The integrated hanger bearing according to claim 7, further including a retaining strap, said retaining strap being releasably attached to said planar portions of said cooperating plates when said plates are retained in contact with one another, said retaining strap extending over said exposed portion of said semi-cylindrical bearing, said retaining strap being adapted to retain the shaft in alignment with said bearing.

9. The integrated hanger bearing according to claim 8, wherein said retaining strap has a first end and a second end, and where each of said ends includes a pair of parallel legs adapted to fit over said planar portions of said cooperating plates when said cooperating plates are retained in contact with one another.

10. The integrated hanger bearing according to claim 9, wherein said retaining strap includes a hinge means, said hinge means comprising a pair of first aligned apertures in said parallel legs proximate said first end of said retaining strap and a pair of first cooperating aligned apertures in each of said cooperating plates, and where a pin is inserted through said first aligned apertures and said first aligned cooperating apertures to snugly friction fit therein, thus providing a point of rotation proximate said first end of said retaining strap.

11. The integrated hanger bearing according to claim 10, wherein said retaining strap further includes a releasable attachment means, said releasable attachment comprising a pair of second aligned apertures in said parallel legs proximate said second end of said retaining strap and a pair of second cooperating aligned apertures in each of said cooperating plates, and where a pin including a pin grasping means is inserted through said second aligned apertures and said second aligned cooperating apertures to removably fit therein, thus providing an releasable attachment point proximate said second end of said retaining strap.

12. The integrated hanger bearing according to claim 11, wherein said rotational prevention means further includes a flat edge element along a second side of said semi-cylindrical bearing.

13. The integrated hanger bearing according to claim 12, wherein said retaining strap further acts as a second anti-rotation means by cooperating with said flat edge element of said semi-cylindrical bearing.

14. The integrated hanger bearing according to claim 7, wherein said semi-cylindrical bearing means is made of a material selected from the group consisting of graphite, molybdenum disulfide, silicon carbide, carbon-carbon, a polymer, or thermosetting resin.

* * * * *